United States Patent
Yarsa et al.

(10) Patent No.: US 6,760,912 B1
(45) Date of Patent: Jul. 6, 2004

(54) DETERMINING BROWSER TYPE IN AN OPEN JAVA ENVIRONMENT

(75) Inventors: Julianne Yarsa, Austin, TX (US); Bruce Arland Rich, Round Rock, TX (US); Theodore Jack London Shrader, Austin, TX (US); Donna Skibbie, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/366,463

(22) Filed: Aug. 3, 1999

(51) Int. Cl.$^7$ ............................................... G06F 9/44
(52) U.S. Cl. ........................... 719/315; 719/331; 713/1
(58) Field of Search .................... 709/1, 100, 310–332; 719/315, 331; 713/1

(56) References Cited

U.S. PATENT DOCUMENTS

| | | | |
|---|---|---|---|
| 5,748,963 A | 5/1998 | Orr | 395/704 |
| 5,778,222 A | 7/1998 | Herrick et al. | 395/609 |
| 5,787,431 A | 7/1998 | Shaughnessy | 707/100 |
| 5,802,276 A | 9/1998 | Benantar et al. | 395/186 |
| 5,815,711 A | 9/1998 | Sakamoto et al. | 395/701 |
| 5,842,020 A | 11/1998 | Faustini | 395/701 |
| 5,848,274 A | 12/1998 | Hamby et al. | 395/705 |
| 5,848,412 A | 12/1998 | Rowland et al. | 707/9 |
| 5,860,004 A | 1/1999 | Fowlow et al. | 395/701 |
| 5,867,707 A | 2/1999 | Nishida et al. | 395/685 |
| 6,286,025 B1 * | 9/2001 | Chang | 709/100 |

OTHER PUBLICATIONS

Mitchell, So what browser is this, any way?, Java World, Jun. 1, 1998, pp. 1–3.*
Birznieks, Platform Checker, Jun. 29, 1998.*
Sun Microsystems, Getting System Properties, The Java Tutorial.*
Sun Microsystems, System Properties, The Java Tutorial.*
Liang, et al. "Dynamic Class Loading in the Java™ Virtual Machine." Sun Microsystems, Inc. 1998. pp. 36–44.

* cited by examiner

*Primary Examiner*—Thomas Lee
*Assistant Examiner*—Diem Cao
(74) *Attorney, Agent, or Firm*—Jeffrey S. LaBaw; Joseph R. Burwell; David Judson

(57) ABSTRACT

A method is provided for determining an identity of a browser in an Java environment in which an intermediary program masks the browser's identity. The method begins by querying an operating system process table for information identifying the browser. Thereafter, a Java properties table including the information from the process table is set. In response to a request from a calling program (e.g., an applet class) for the browser identity, a getProperty method is then called to retrieve the browser identity from the properties table. The browser identity is then returned to the calling program.

26 Claims, 3 Drawing Sheets

DETERMINING BROWSER TYPE IN AN OPEN JAVA ENVIRONMENT

BACKGROUND OF THE INVENTION

1. Technical Field

The present invention relates generally to techniques for determining a browser type in a Java runtime environment.

2. Description of the Related Art

Java, originally developed by Sun Microsystems, is a known software programming environment in which software programs, known as Java applets or applications, are developed, tested and maintained. Java programs have found extensive use on the World Wide Web, which is the Internet's multimedia information retrieval system.

To have Java applets that provide interesting browser-side functionality usually requires extra-sandbox privileges or security exemptions. In the prior art, applet developers requiring security had two choices when creating applets. They could write two applets that individually exploited the functionality of the different web browsers (i.e. Netscape Navigator and Microsoft Internet Explorer) or they could create one applet that generically called the security methods available in each browser. In either case, however, the applet would be tied to the version of the Java Runtime Environment (JRE) shipped with the browser. Thus, applet developers have been unable to take advantage of new JREs and the functionality that they contain.

Recently, however, Sun's JavaSoft introduced the Java 2 development platform. The Java 2 Java runtime environment (JRE) includes a plug-in that allows developers and users to run applets in their web browsers with different JREs. Using JavaSoft's Java Plug-in, applets can be run in Internet Explorer or Netscape Communicator using a Java Runtime Environment (JRE) selected by the user. This enables applets to run in an open Java environment, namely, one that is not tied to proprietary classes and methods provided by the browser.

One problem with this scenario is that the true identity of the browser is masked by the Java Plug-in and there is no way to determine the actual browser environment. In particular, Java 2 does not provide any core Java class to consult for parent process information. Knowing the operating environment becomes important if applet or Java core classes need to perform operations in one environment but not in the other. For example, it may be desirable to emulate Microsoft interfaces in an Internet Explorer environment but not in Netscape; likewise, it may be desirable to emulate Netscape interfaces when running in Communicator but not in Internet Explorer.

In a native browser environment, a number of Java properties reflect the browser identity. The value of various Java properties in different operating environments is quite varied, and the Java Plugin masks the running browser's true identity. It is known in the prior art how to determine the browser environment when the browser's native JVM is being used. In the past, this has been accomplished by querying a java.vendor property or by making various calls to the netscape.javascript package (which is supported by Internet Explorer). However, there is no method known in the art for determining the browser environment when the browser has loaded a nonbrowser JRE via the Java Plugin.

Thus, there is a need to provide a technique to determine a browser identity while operating, for example, in the Java Plugin open environment. The present invention solves this problem.

BRIEF SUMMARY OF THE INVENTION

In a preferred embodiment, a method is provided for determining an identity of a browser in an Java environment in which an intermediary program masks the browser's identity. The method begins by querying an operating system process table for information identifying the browser. Thereafter, Java properties including the information from the process table are set. In response to a request from a calling program (e.g., an applet class) for the browser identity, a getproperty method is then called to retrieve the browser identity from the properties table. The browser identity is then returned to the calling program.

In accordance with an illustrative embodiment, a trusted Java class is modified according to the present invention to include several operations in its static initialization. The trusted class loads a native method dynamic link library (.dll) and calls an appropriate method that returns the current process name. The process name is then used by a given method (e.g., System.setProperty method) to set a set of Java properties, e.g., java.vendor, browser.vendor and browser. When an applet or core Java class needs to know its true browser environment, that class can call a public method (e.g., System.getProperty) with one of the properties to determine the browser type.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
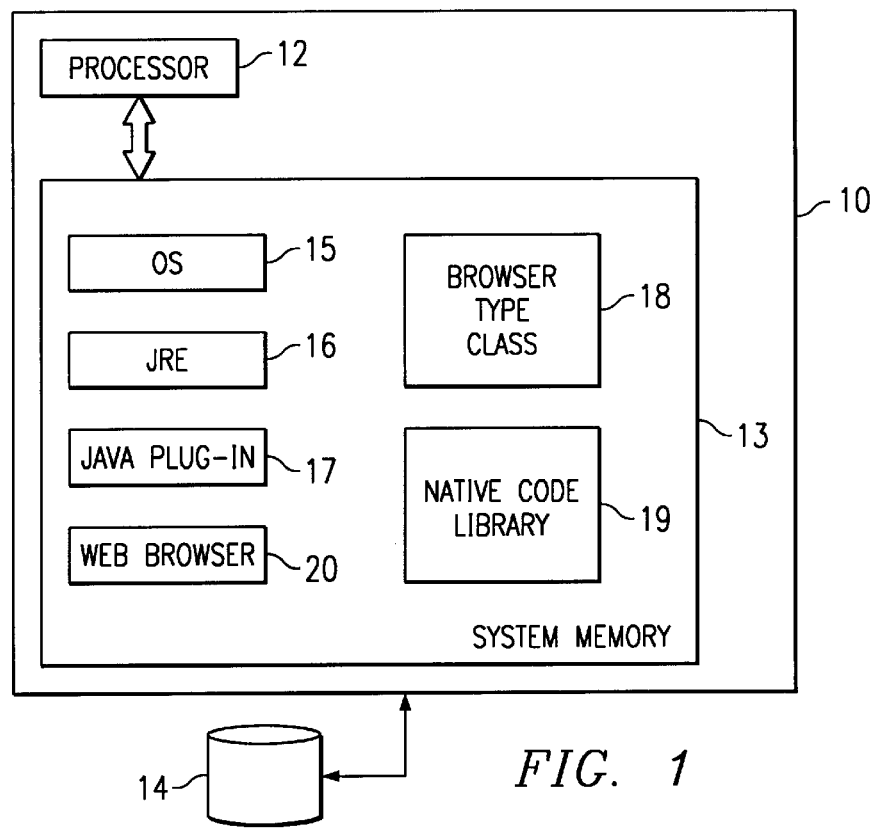
FIG. 1 illustrates a computer in which the present invention may be implemented.

As will be described below, one or more of the processes that comprise the present invention may be carried out on a computer, or on one or more computers connected via a computer network. Referring to FIG. 1, a computer for use in implementing the present invention is shown. The computer 10 has a processor 12, system memory 13, permanent memory 14, an operating system 15, a Java Runtime Environment ("JRE") 16, a Java Plug-in 17, a browser type Java class 18, a native code library 19 that interfaces between the Java class 18 and the operating system 15, and a browser 20 that supports the Java plug-in 17. As will be seen, in the preferred embodiment the browser type Java class 18 and the native code library 19 implement the functionality of the present invention. A representative computer is any personal computer or workstation platform that is Intel-, PowerPC®- or RISC®-based, and that includes an operating system such as Microsoft Windows NT with Service Pack 4 installed, JRE Java 2 with the Java Plug-in for Java 2 installed, and a browser that supports the Java Plug-in, such as Netscape Communicator 4.06. This configuration, of course, is not to be taken to limit the invention.

Figure 2:
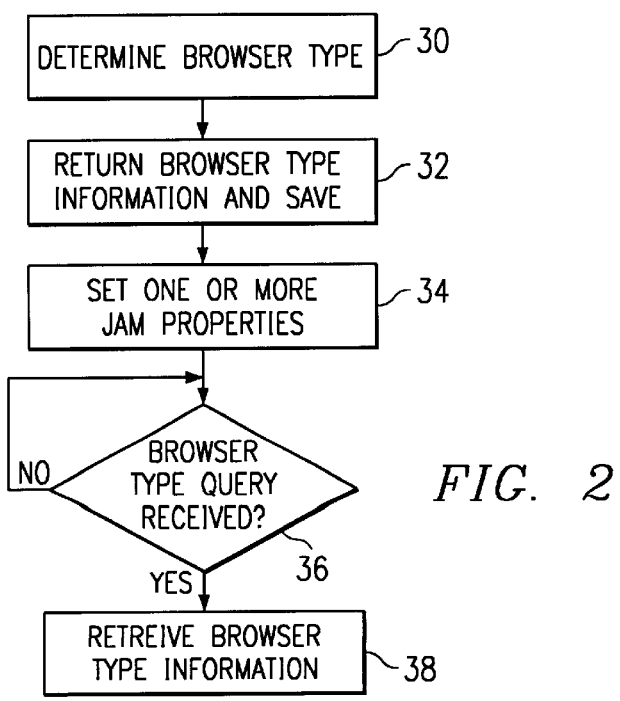
FIG. 2 is a simplified flowchart illustrating a preferred method for determining browser type according to the present invention.

FIG. 2 is a simplified flowchart of the inventive method of the present invention. The method begins at step 30 by determining a browser type. In particular, there are established methods available in C code to query an operating system process table to find the information of a currently running process (for example, iexplore.exe or netscape.exe). According to a preferred embodiment of the present invention, these functions are built into a dynamic link library (.dll), namely, native code library 19, and accessed through the Java Native Interface (JNI) by a class that has access rights to load the .dll. This class is the browser type class 18.

An extension to this approach is provided by defining a new Java property (e.g., the property "java.browser.type") whose valid values are ns, ie and default. A value of "ns" causes the browser type to be set to Netscape, with no native method calls and regardless of the true browser identity. Similarly, a value of "ie" causes the browser type to be set to Internet Explorer. A value of default requires the identity of the browser be determined via native methods using the native code library as described above. This extension allows the applet to emulate a particular browser environment regardless of the identity of the actual browser in which it is running, and it is useful for applet development and debugging purposes.

At step 32, the browser type information obtained by invoking the native method is returned and saved. At step 34, one or more readable Java properties are then set. For example, if the native method call returns the process name of iexplore.exe (meaning that the browser is Internet Explorer), then the following Java properties preferably are set:

java.vendor=Microsoft Corp.

browser.vendor=Microsoft Corp. (or define as null to correspond to native browser property value)

browser=Internet Explorer (or define as null to correspond to native browser property value)

The preceding values would also be set if the optional java.browser.type property is defined as "ie". If the native method returns a process name of netscape.exe (meaning that the browser is Netscape), the properties preferably are set as follows:

java.vendor=Netscape Communications Corporation browser.vendor=Netscape Communications Corporation browser=Netscape Communicator The preceding values would also be set if the optional java.browser.type property is defined as "ns".

The routine then continues at step 36 by testing whether a query for the browser type has been received. If not, the routine cycles and waits for such a query. When the outcome of the test at step 36 is positive, the routine continues at step 38 to retrieve the browser type information. In particular, once the Java properties have been set as described above, to determine browser type, any other class simply makes a System.getProperty call on the desired property and acts accordingly based on the return value. Because Java properties are access controlled, the caller must have read permission to whichever property is queried.

To provide a concrete example, a trusted class is modified according to the present invention to include several operations in its static initialization. The trusted class loads the native method .dll and calls the method that returns the current process name. The process name is then used to set the java.vendor, browser.vendor and browser properties via the System.setProperty method. Because the class is trusted, there is no problem setting system properties. When an applet or core Java class needs to know its true browser environment, that class can call the public method System.getProperty with one of the properties listed above. As noted above, the calling class must have read access to the property being queried; therefore, the Java policy must explicitly include that access for the applet classes. This is true of any Java system property.

A useful extension to this approach is provided by having the process-querying class retrieve a variety of process information and not just the browser name. Such information may include, for example, process id, CPU usage, memory size, or other data available from the operating system's process table.

Thus, in the preferred embodiment, the present invention is implemented using two components: the trusted browser type class (called ProcessInfo) and the native code library (called proc.dll). The class queries the operating system for process information, stores the information in a given format, and makes the information available to callers. The native-code library interfaces between the Java class and the operating system. Although not required, it is desirable to have a single class dedicated to the inventive technique because querying the operating system requires native calls that are relatively expensive performance-wise. The first time any class requires the information, the ProcessInfo class can load proc.dll, retrieve and store the process data, and then the information is available to all other classes via Java calls. As will be seen below, if the required information is dynamic (for example, process running time or memory usage), a native call may be needed at each request to get accurate information.

The ProcessInfo class may have the following attributes and methods:

| | |
|---|---|
| private String processName; | // the process name |
| private int UID; | // the process user id |
| private int PID; | // the process id |
| private int PPID; | // the process' parent process id |
| private int runningTime; | // CPU time spent on the process |
| private int memorySize; | // real memory occupied by the process |
| | // other interesting process properties |
| public static String getProcessName ( ); | |
| public static int get UID ( ); | |
| public static int getPID ( ); | |
| public static int getPPID ( ); | |
| public static int getRunningTime ( ); | |
| public static int getMemorySize ( ); | |
| | // other public getters |

In the static initialization block of ProcessInfo (which is run the first time the class is referenced and loaded), the proc.dll is loaded and one or more native calls is made to get the data to fill in the private attributes. Afterwards, public methods are used to retrieve the information. An alternative methodology would be for the ProcessInfo class to set Java properties with the data and have callers use the System.getProperty ( ) method to retrieve the information. This approach requires a priori knowledge of the property names by the callers and the appropriate Java permissions to read those properties. It also means that ProcessInfo must be loaded before any calls to get those properties are made.

Figure 3:
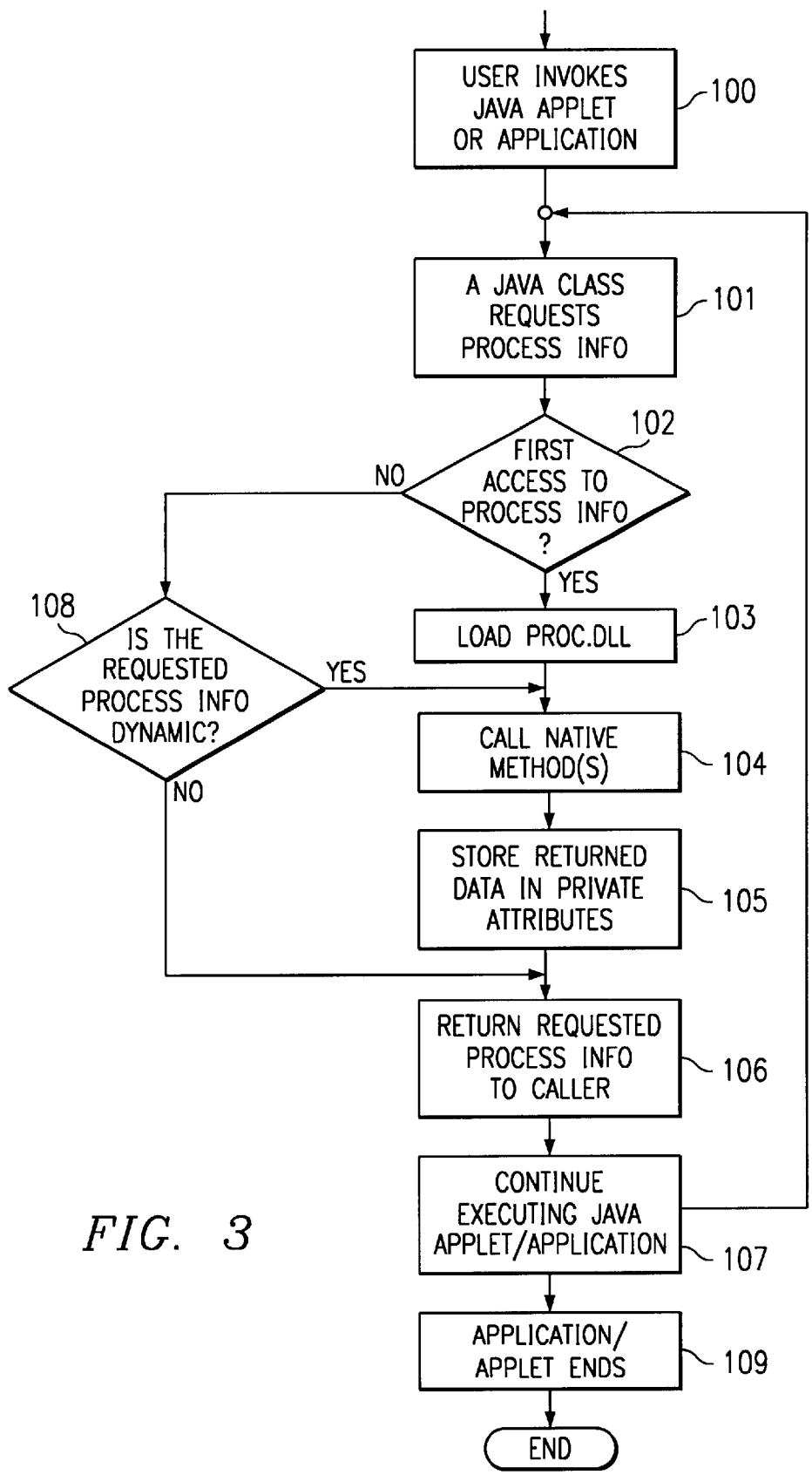
FIG. 3 is a more detailed flowchart illustrating a preferred embodiment of the present invention.

FIG. 3 illustrates the preferred routine in more detail. The routine begins at step 100. In this step, the user invokes a Java applet (by loading its HTML file into a Web browser) or a Java application (by passing the application class name as an argument to the Java interpreter executable). Steps 101–108 illustrate the logic involved when an executing class needs information about the parent process it is running in.

At step 101, the routine calls a method of a class that is used to provide the information about the parent process. As discussed above, this class is called ProcessInfo. A test is then performed at step 102 to determine whether this the first request for process information of any kind. If the outcome of the test at step 102 is positive, the ProcessInfo class is loaded at step 103. When the ProcessInfo class is first loaded, its static initializer is run. One operation of initialization is to load the library that contains the native methods to query the operating system for process information. With the necessary native methods loaded, the routine continues at step 104 with ProcessInfo calling these methods to get the required information. At step 105, the data returned by the native method is stored in private attributes within the ProcessInfo class or, alternatively, as Java system properties. Subsequent requests for that data can then be satisfied simply by returning the stored data. If the data were not stored, a native call would be required at every request for process information. This is undesirable because native calls from Java code have poorer performance than pure Java calls.

At step 106, the requested information is returned to the calling class. Execution of the applet or application continues at step 107. In the course of execution, more requests may be made for process information, which is indicated by the arrow returning to step 101 as shown.

Step 108 is reached when there is a negative outcome of the test at step 102. If a class requests process information that is dynamic in nature, e.g., memory usage or CPU usage, then the ProcessInfo class must make a native call to get accurate data. Thus, step 108 tests to determine whether the requested process information is dynamic. If so, the routine makes a native call at step 104, which as noted above is also done if the specified data has not been previously retrieved and stored.

If the outcome of the test at step 108 is negative, the routine branches to step 106 as previously described. In particular, if the information requested is static in nature, e.g., process name or process ID, and the data has been previously retrieved and stored, then ProcessInfo can return the stored data directly. This saves a costly call out to native code.

At step 109, the applet or application completes execution. This completes the processing.

The preferred embodiment, described above, has the advantage of not requiring modifications to the Plugin elements. If this is not limitation, an alternative to the above-described technique is to modify the C code of the plugin itself (the Netscape plugin or a Microsoft ActiveX control) to pass the proper Java property value to the JRE. In such case, the browser itself (via a Netscape plug-in or an Internet Explorer ActiveX control) passes information (such as the browser name) to the JRE.

Figure 4:
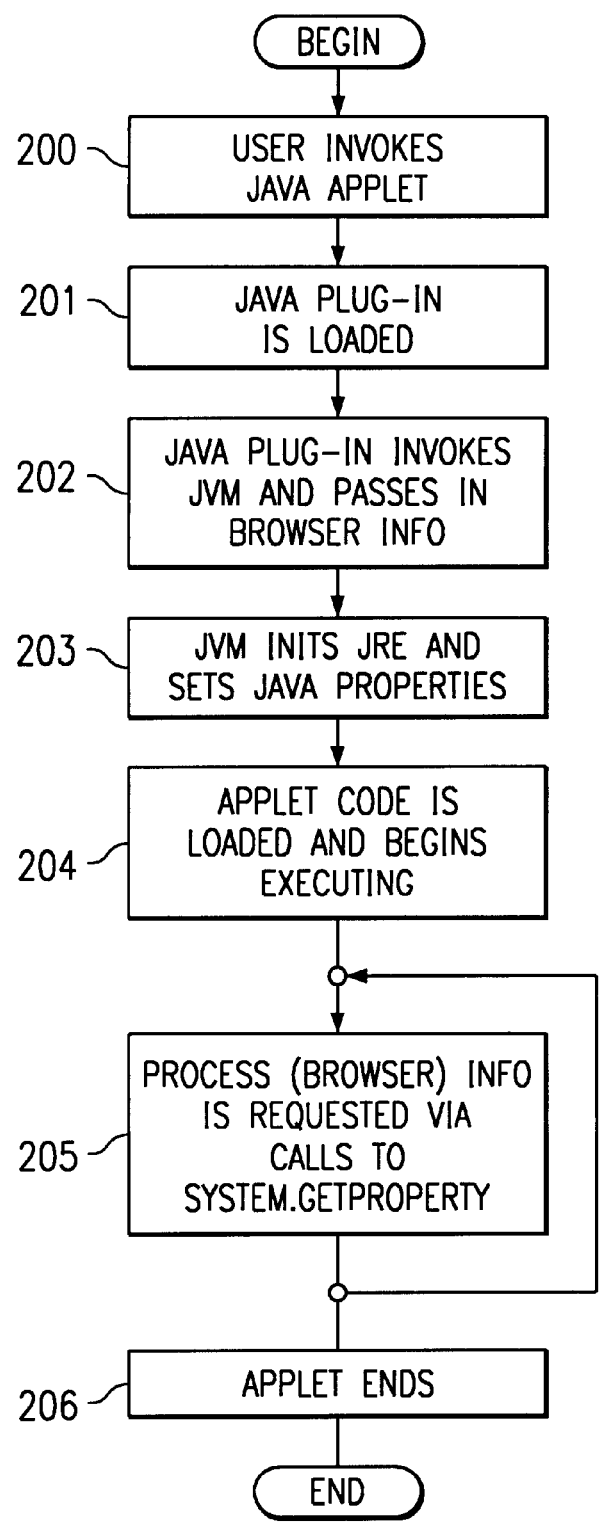
FIG. 4 is a flowchart illustrating an alternate embodiment of the present invention.

This alternative methodology is diagrammed in the accompanying FIG. 4.

The routine begins at step 200 when the user invokes a Java applet by loading its HTML file into a Web browser. At step 201, the Java Plug-in is loaded. In particular, via special tags in the HTML file, the browser knows to run the Java Plug-in (part of Java 2), which is implemented as a Netscape plugin or a Microsoft ActiveX control. The name of the browser is hardcoded into the Plug-in and is based on the platform the Plug-in runs on. At step 202, the Java Plug-in invokes the Java Virtual Machine and passes in the name of the browser (and possibly other static process information) as arguments. At step 203, the JVM initializes the Java Runtime Environment. At this time, the value of specific Java properties is set to the static process information. Examples of such properties are java.vendor, browser.vendor and browser. After the JRE is initialized, the applet is rendered in the browser. This is step 204.

As part of the applet execution, an executing class may query for process information, e.g., by using the System.getProperty ( ) method. The class must know the name of the property to query and must have Java read permission for that property. Several such queries can be made during the course of execution, as indicated by step 205. At step 206, the applet completes execution. This completes the processing.

This alternate methodology requires modification to the Plug-in itself and can only return static information. It is also restricted to browsers and does not support Java applications. Classes wishing to retrieve the information must know a priori which Java properties to query and must have the Java read permission to those properties. Nevertheless, in certain circumstances it may also be used to achieve the objects of the present invention.

The present invention enables a class to easily determine whether given code is running in Internet Explorer or Netscape Navigator. While the preferred implementation for this invention is tied directly to determining the browser type running an applet, the inventive technique can be generalized to determining any operating-system property of the process running a Java applet or application. Moreover, the present invention may be used for determining an identity of any source program in an environment in which an intermediary program masks the source program identity. In particular, the invention may be applied in any environment in which an intermediary masks the identity of a Java program's parent process. The implementation set forth above may be used for these more general applications.

Thus, information other than the parent process name (browser identity) can be obtained from the inventive technique. Such information includes, without limitation, data such as process id, CPU usage, and the like, and this data may be static or dynamic in nature. The process information can be obtained by a trusted Java class (either a newly-implemented one or one that pre-exists in the JRE) that calls native methods and then stores the data, or by the intermediary entity itself, which will pass the information to the JRE.

Another extension of the present invention is to define the process data with Java properties listed in the java.security configuration file. For example, a property called java.browser.type may be used to define the browser type. If the property is present, it will define the browser identity, regardless of the true identity. If the property is absent, a native call can be made to obtain the data. Other process information could be property-defined in the same manner. The ability to override the true process information with Java properties is valuable for testing and debugging Java programs.

As noted, the process information can be stored as attribute values in a trusted class or as Java properties. If stored as class attributes, classes requiring the process information would call public get methods for the desired data. If stored as Java properties, classes requiring the information would call the System.getProperty ( ) method for the property desired. In the preferred embodiment, a call to a get method could trigger retrieval of process information in realtime so that there is no need to obtain the data and set a property in advance, which is advantageous. In this technique, querying classes need not know the names of a variety of Java properties (which may not be well-publicized, just a public interface, and such classes need not have permission to read any special Java properties, although the public get methods could require special permissions to query the data, if desired.

As noted above, the inventive mechanism is preferably implemented in a Java class and a native code library. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by letters patent is set forth in the following claims:

We claim:

1. A computer implemented method for determining an identity of a source program in an environment in which an intermediary program masks the source program identity, comprising the steps of:
   querying a process table for information on a currently running source program;
   setting a properties table to include the information from the process table; and
   responsive to a request for the source program identity, calling a get property method to retrieve the source program identity from the properties table.

2. The method as described in claim 1 further including the step of returning to a caller the source program identity.

3. The method as described in claim 1 wherein the environment is a Java environment and the intermediary program is a Java Plug-in.

4. The method as described in claim 3 wherein the source program is a web browser.

5. The method as described in claim 4 wherein the web browser is Netscape Navigator.

6. The method as described in claim 4 wherein the web browser is Microsoft Internet Explorer.

7. The method as described in claim 1 wherein the querying step is performed upon initialization by a class having access rights to a dynamic link library that calls the process table.

8. The method as described in claim 1 further including the step of authorizing a process read access to the source program identity.

9. The method as described in claim 1 wherein the querying step is initiated by an applet.

10. A computer implemented method for determining an identity of a browser in an Java runtime environment in which an intermediary program masks the browser's identity, comprising the steps of:
    querying an operating system process table for information identifying the browser;
    setting a Java properties table including the information from the operating system process table;
    responsive to a request from a calling program for the browser identity, calling a get property method to retrieve the browser identity from the Java properties table; and
    returning the browser identity to the calling program.

11. The method as described in claim 10 wherein the intermediary program is a Java Plug-in.

12. The method as described in claim 11 wherein the calling program is an applet class.

13. The method as described in claim 10 wherein the querying step is performed upon initialization by a class having access rights to a dynamic link library that calls the operating system process table.

14. The method as described in claim 10 further including the step of authorizing a process read access to the browser identity.

15. The method as described in claim 10 wherein the Java properties table includes a Java vendor property, a browser vendor property, and a browser property.

16. A computer program product in a computer readable medium for determining an identity of a browser in an environment in which an intermediary program masks the browser's identity, comprising:
    means for querying a process table for information on a currently running browser;
    means for setting a properties table including the information from the process table; and
    means responsive to a request for the browser identity for calling a get property method to retrieve the browser identity from the properties table.

17. The computer program product as described in claim 16 wherein the environment is a Java runtime environment and the intermediary program is a Java Plug-in.

18. The computer program product as described in claim 17 wherein the properties table includes a Java vendor property, a browser vendor property, and a browser property.

19. The computer program product as described in claim 16 wherein the means for querying includes means for defining a property having attributes that identify a given browser type.

20. The computer program product as described in claim 16 further including means for authorizing a process read access to the browser identity.

21. A computer implemented method for determining an identity of a browser in an Java environment in which a Java Plug-in masks the browser's identity, comprising the steps of:
    hardcoding a browser type into the Java Plug-in code;
    when an applet is called, having the Java Plug-in pass in the browser type to a virtual machine;
    setting a properties table including information identifying the browser type;
    in response to a query from a class executing in the applet, calling a get property method to retrieve the browser type from the properties table.

22. The method as described in claim 21 wherein the properties table includes a Java vendor property, a browser vendor property, and a browser property.

23. A computer implemented method for determining process information associated with a source program in an environment in which an intermediary program masks the source program process information, comprising the steps of:

querying a process table to retrieve process information on a currently running source program;

setting a properties table to include the process information retrieved from the process table; and responsive to a request for the source program process information, calling a get property method to retrieve the source program process information from the properties table.

24. The method as described in claim 23 wherein the process information is an identity.

25. The method as described in claim 23 wherein the process information is a process id.

26. The method as described in claim 23 wherein the process information is a given usage value.

* * * * *